(12) United States Patent  (10) Patent No.: US 7,643,175 B2
Tai et al.                    (45) Date of Patent:   Jan. 5, 2010

(54) COLOR PRINT ENHANCEMENT SYSTEM WITH CONVERSION OF PCS ENCODED PICTURE INTO PHOTOGRAPHIC PROCESS CONFINED PCS AND CORRECTION FOR FINISH

(75) Inventors: Hwai-Tzuu Tai, Rochester, NY (US); Diane M. Herrick, Rochester, NY (US); Stephen E. Johnson, Pittsford, NY (US); Christopher M. Heinz, Blunenburg, MA (US); Chung-Hui Kuo, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 567 days.

(21) Appl. No.: 11/610,551

(22) Filed: Dec. 14, 2006

(65) Prior Publication Data

US 2008/0144141 A1   Jun. 19, 2008

(51) Int. Cl.
   H04N 1/50   (2006.01)
   H04N 1/58   (2006.01)
(52) U.S. Cl. .................. 358/1.9; 358/3.27; 358/518; 358/530
(58) Field of Classification Search .......... 358/1.9, 358/3.27, 504, 518, 530, 162, 167
   See application file for complete search history.

(56) References Cited

U.S. PATENT DOCUMENTS

| 5,234,782 | A |   | 8/1993  | Aslam et al. |
| 5,521,723 | A | * | 5/1996  | Madden et al. ............ 358/501 |
| 5,668,596 | A |   | 9/1997  | Vogel |
| 5,999,703 | A |   | 12/1999 | Schwartz |
| 6,008,907 | A |   | 12/1999 | Vigneau et al. |
| 6,044,173 | A |   | 3/2000  | Kumada |
| 6,075,888 | A |   | 6/2000  | Schwartz |
| 6,121,986 | A |   | 9/2000  | Regelsberger et al. |
| 6,535,712 | B2 |  | 3/2003  | Richards |
| 6,650,771 | B1 |  | 11/2003 | Walker |
| 6,668,077 | B1 | * | 12/2003 | Ohkubo ..................... 382/162 |
| 6,791,716 | B1 |  | 9/2004  | Buhr et al. |
| 6,792,864 | B2 |  | 9/2004  | Piatt et al. |
| 6,816,179 | B2 |  | 11/2004 | Hanyu |
| 6,850,342 | B2 |  | 2/2005  | Woolfe et al. |
| 6,985,688 | B2 |  | 1/2006  | Ishizuka et al. |
| 7,057,631 | B2 |  | 6/2006  | Nakamura et al. |
| 7,095,529 | B2 |  | 8/2006  | Krueger et al. |
| 7,154,633 | B2 |  | 12/2006 | Shimazaki |
| 7,236,734 | B2 |  | 6/2007  | Ng et al. |
| 2002/0124027 | A1 | | 9/2002  | Krueger et al. |
| 2003/0112454 | A1 | | 6/2003  | Woolfe et al. |
| 2004/0021879 | A1 | | 2/2004  | Castelltort et al. |
| 2005/0019077 | A1 | | 1/2005  | Hatta et al. |
| 2005/0021956 | A1 | | 1/2005  | Genty et al. |
| 2005/0025540 | A1 | | 2/2005  | Murai et al. |
| 2005/0117948 | A1 | | 6/2005  | Hatta et al. |
| 2005/0152612 | A1 | | 7/2005  | Spaulding et al. |

(Continued)

Primary Examiner—Scott A Rogers
(74) Attorney, Agent, or Firm—Donna P. Suchy

(57) ABSTRACT

A system and method for enhancing a print using a color imaging system are provided. The automatic color enhancement system results in digital prints that have a photographic "look and feel" by using special profiles and adjustments that capture the traditional photographic image process of photo-like color and tone scale reproduction to RGB-encoded picture elements and to be used to combine in with electrophotographic process media ICC profile.

23 Claims, 15 Drawing Sheets

U.S. PATENT DOCUMENTS

| | | |
|---|---|---|
| 2005/0191032 A1 | 9/2005 | Seo et al. |
| 2005/0201770 A1 | 9/2005 | Sawada |
| 2005/0214669 A1 | 9/2005 | Hayashi et al. |
| 2005/0219585 A1* | 10/2005 | Suzuki et al. ................ 358/1.9 |
| 2006/0110193 A1 | 5/2006 | Emmert et al. |
| 2006/0188301 A1 | 8/2006 | Ng et al. |
| 2006/0285890 A1 | 12/2006 | Ng |
| 2007/0097461 A1 | 5/2007 | Ng et al. |
| 2008/0012875 A1* | 1/2008 | Newman ................ 345/589 |
| 2008/0204775 A1* | 8/2008 | Kawashima et al. ......... 358/1.9 |

* cited by examiner

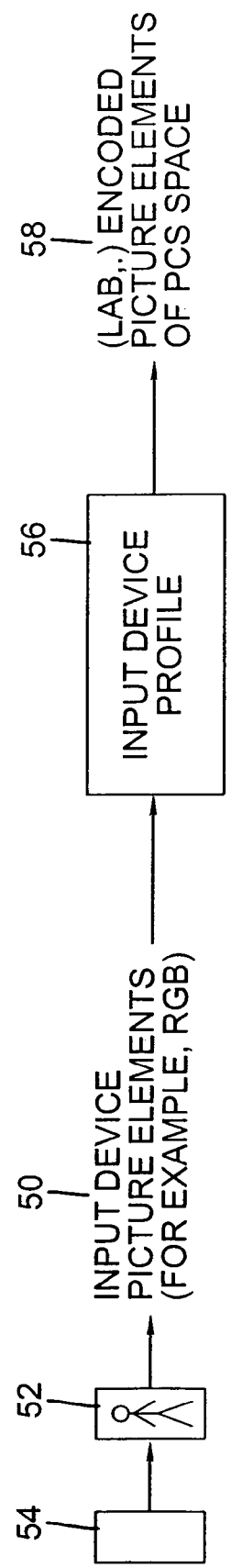
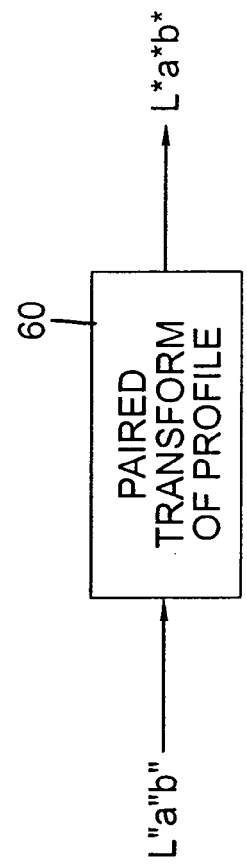
FIG. 3a
FIG. 3b

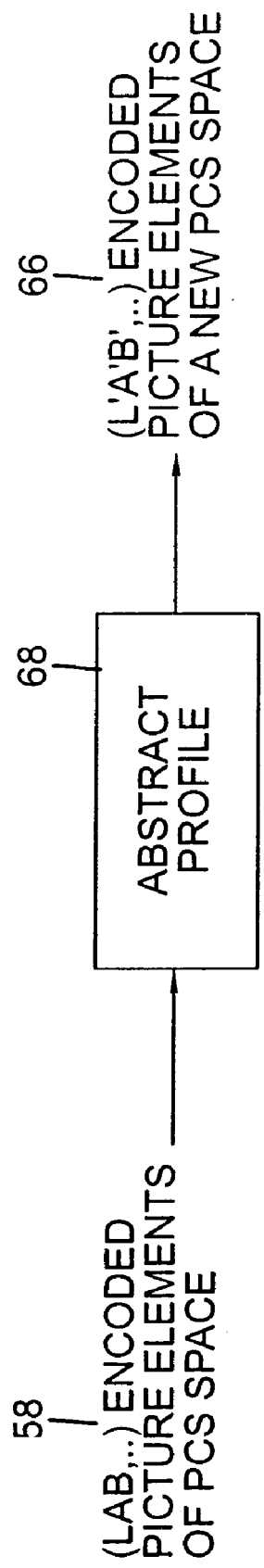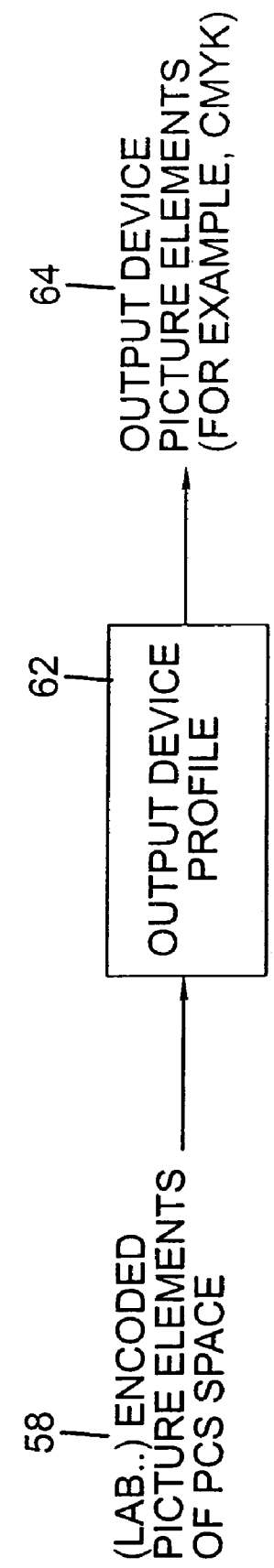
FIG. 3c
FIG. 3d

2D ILLUSTRATION OF ENHANCING HUE MAPPING

COLOR PRINT ENHANCEMENT SYSTEM WITH CONVERSION OF PCS ENCODED PICTURE INTO PHOTOGRAPHIC PROCESS CONFINED PCS AND CORRECTION FOR FINISH

FIELD OF THE INVENTION

The invention relates to electrographic printers and apparatus thereof. More specifically, the invention is directed to processes and apparatus for enhancing color prints in digital color reproduction systems.

BACKGROUND OF THE INVENTION

Electrographic printers use a developer mixing apparatus and related processes for mixing the developer or toner used during the printing process. The four-color electrophographic printers, for example, employ the four color toners, cyan, magenta, yellow and black (CMYK) used in the printing process to form a color image. The term "electrographic printer," is intended to encompass electrophotographic printers and copiers that employ dry toner developed on an electrophotographic receiver element, as well as ionographic printers and copiers that do not rely upon an electrophotographic receiver Digital color reproduction printing systems typically include digital front-end processors, digital color printer, and post finishing systems (e.g., UV coating system, glosser system, laminator system, and etc). It reproduces original pleasing color onto substrates (such as paper). The digital front-end processors take input electronic files (such as postscript command files) composed of images from other input devices (e.g., a scanner, a digital camera) together with its own internal other function processors (e.g., raster image processor, image positioning processor, image manipulation processor, color processor, image storage processor, substrate processor, and etc) to rasterizing input electronic file to become proper image bitmaps for printer to print. An operator may be assisted to set up parameters such as layout, font, color, paper, post-finishing, and etc among those digital font-end processors. The printer (e.g., an electrographic printer) takes rasterized bitmap and renders the bitmap into a form that can control the printing process from the exposure device to writing the image onto paper. The post-finishing system puts finishing touch on the prints such as protection, glossing, and binding etc.

In an electrophotographic modular printing machine of known type, for example, the 2100 printer manufactured by Eastman Kodak of Rochester, N.Y., color toner images are made sequentially in a plurality of color imaging modules arranged in tandem, and the toner images are successively electrostatically transferred to a receiver member adhered to a transport web moving through the modules. Commercial machines of this type typically employ intermediate transfer members in the respective modules for the transfer to the receiver member of individual color separation toner images. Of course, in other electrostatographic printers, each color separation toner image is directly transferred to a receiver member.

Electrostatographic printers having multicolor capability are known to also provide an additional toner depositing assembly for depositing clear toner. The provision of a clear toner overcoat to a color print is desirable for providing protection of the print from fingerprints and reducing certain visual artifacts. However, a clear toner overcoat will add cost and may reduce color gamut of the print; thus, it is desirable to provide for operator/user selection to determine whether or not a clear toner overcoat will be applied to the entire print. In U.S. Pat. No. 5,234,783, issued on Aug. 10, 1993, in the name of Yee S. Ng, it is noted that in lieu of providing a uniform layer of clear toner, a layer that varies inversely according to heights of the toner stacks may be used instead as a compromise approach to establishing even toner stack heights. As is known, the respective color toners are deposited one upon the other at respective locations on the receiver member and the height of a respective color toner stack is the sum of the toner contributions of each respective color and provides the print with a more even or uniform gloss.

In U.S. Pat. No. 7,23 6,734, in the name of Yee S. Ng et al, a method is disclosed of forming a print having a multicolor image supported on a receiver member wherein a multicolor toner image is formed on the receiver member by toners of at least three different colors of toner pigments which form various combinations of color at different pixel locations on the receiver member to form the multicolor toner image thereon; forming a clear toner overcoat upon the multicolor toner image, the clear toner overcoat being deposited as an inverse mask; pre-fusing the multicolor toner image and clear toner overcoat to the receiver member to at least tack the toners forming the multicolor toner image and the clear toner overcoat; and subjecting the clear toner overcoat and the multicolor toner image to heat and pressure using a belt fuser to provide an improved color gamut and gloss to the image. The inverse masks, the pre-fusing conditions, and the belt fuser set points can be optimized based on receiver member types to maximize the color gamut. However, due to the significant change in the color gamut, new color profiles will need to be built for each receiver member used to obtain the desired color.

The full CMYK digital color printing presses (with electrophotographic process or DI offset process) have been, traditionally, being calibrated and setup to reproduce original color on different media. The quality of color reproduction has been excellent good in general. This color reproduction process is usually carried out through color management system which captures the underneath image printing process (i.e., electrophotographic process or DI offset process) implemented in the press. In digital era, since the original scene is captured through digital camera instead of film. The characteristics of digital camera are not the same as the characteristics of the film. Different image capture medium and underneath image printing process has resulted prints with different look especially compared to CMYK color printing press of electrophotographic process with the traditional photographic printing process. The different look between CMYK electrophotographic color printing press and photographic printing process are essentially caused by two different means of color reproduction process.

There is a need to have CMYK electrophotographic color press prints with a similar look as the photographic printing process. This lack of "photographic look and feel" can overcome the shortcoming of previous printing systems and related methods by using multiple color transforms (or ICC profiles) pre-loaded into color management system to generate multiple look-and-feel as customer selects. These processes bring in and joint together traditional photographic printing process with electrophotographic printing process to deliver superior photographic quality prints on electrophotographic process. This automated process that takes into account photographic qualities and dynamically adjusts the system to the desired parameters. The CMYK electrophotographic color printing press with these processes can generate different feel-and-look to the photographic printing process. These processes can be extended to mimic other different feel-and-look.

SUMMARY OF THE INVENTION

The color print enhancement system and related method are in the field of color reproduction printing systems, which include digital front-end processors, color printers and post-finishing systems including coaters, glossers, laminators, and other finishers. More specifically, the invention relates to an automatic color enhancement of the digital prints to give a photographic "look and feel" by using special ICC profiles capture the traditional photographic image process of photo-like color and tone scale reproduction to RGB-encoded picture elements and to be used to combine in with electrophotographic process ICC profiles. The look-and-feel includes a color reproduction point of view that includes combining photographic process and electrophotographic process of particular color look with specific color transforms (or ICC profiles) and also includes the properties of the receivers and the surface treatments that results in different finishes, thereby contributing to the look-and-feel. All of these factors are incorporated into the color print enhancement system which includes specific ICC profiles that capture the characteristics of photographic process as well as abstract profiles for adjustments that take into account processing conditions such as overcoating with clear dryink in the $5^{th}$ color module to give a surface texture and/or fusing to give a selected gloss.

DETAILED DESCRIPTION OF THE INVENTION

The full CMYK digital color presses have been, traditionally, calibrated and setup to reproduce original color on different media. In digital era, the original scene is captured through digital camera instead of film. The characteristics of digital camera are not the same as the characteristics of the film. Different image capture medium has resulted prints with different look especially compared to CMYK color press with the traditional photographic process. The different look between CMYK color press and photographic process are essentially caused by these two different means of color reproduction.

Figure 1:
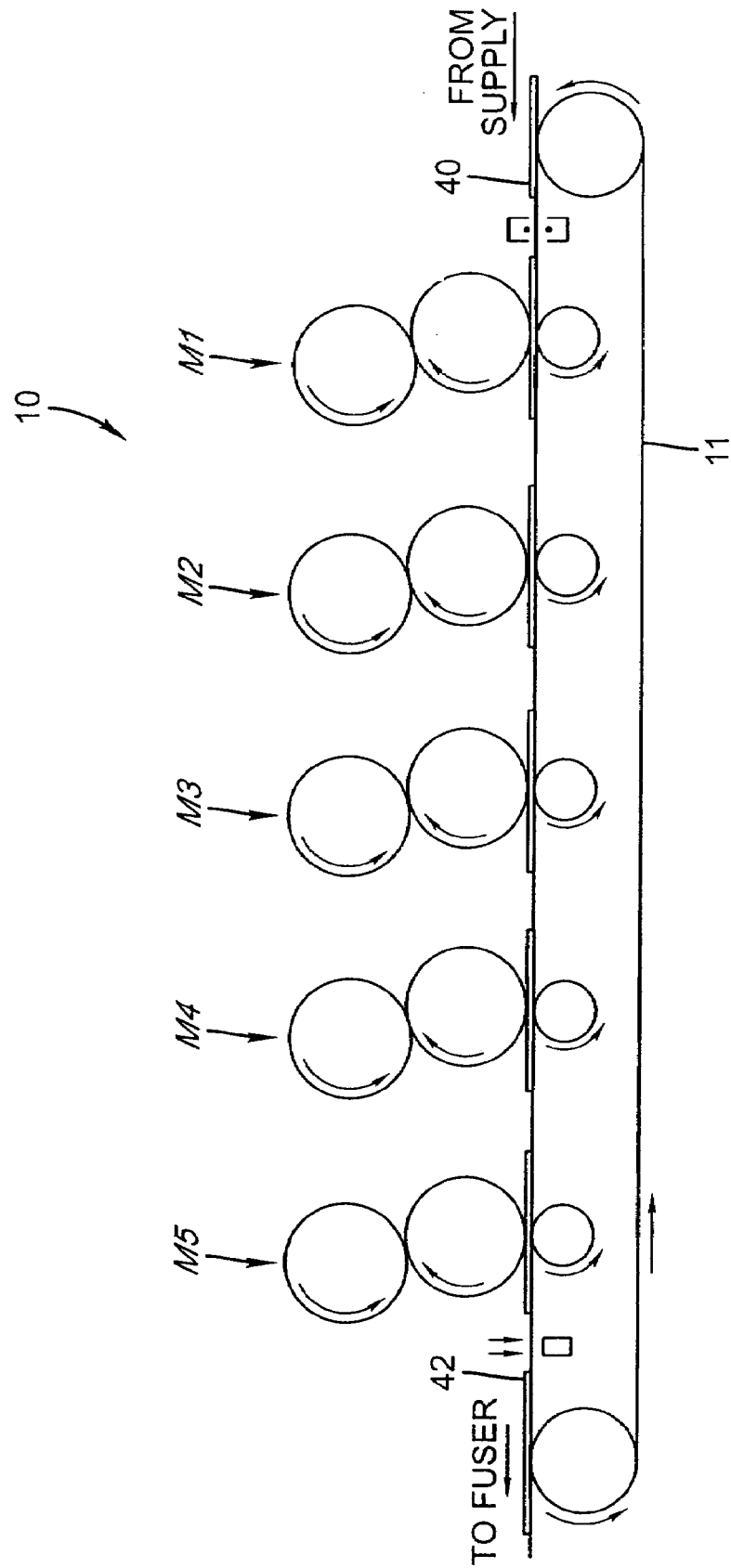
FIG. 1 is a schematic illustration of an electrophotographic print engine or printer apparatus, having a plurality of printing assemblies or modules that may be used in accordance with the present invention.

FIG. 1 is a side elevational view schematically showing portions of an electrophotographic print engine or printer apparatus 10 suitable for printing multicolor toner images on receiver members. A plurality of colors may be combined on a single receiver member using electrographic printers. The term "electrographic printer," is intended to encompass electrophotographic printers and copiers that employ dry toner developed on an electrographic receiver element, as well as ionographic printers and copiers that do not rely upon an electrographic receiver. The color electrophographic printer shown in FIG. 1 employs a plurality of color toner modules (represented for reference only in FIG. 1 as M1-M5), such as the CMYK toner system, in conjunction with printing on a substrate that travels along a transport web 11. Each of the modules generates a single-color toner image for transfer to a receiver member successively moved through the modules. The modules can also be used to provide a clear toner overcoat as described in pending application Ser. No. 11/155,268.

Each receiver, during a single pass by the modules, can have transferred in registration thereto, for a plurality of single-color toner images to form a multicolor image with a clear toner overcoat or other desired application. As used herein, the term multicolor implies that in an image formed on the receiver member has combinations of subsets of primary colors combined to form other colors on the receiver member, at various locations on the receiver member. The primary colors participate to form process colors in at least some of the subsets, wherein each of the primary colors may be combined with one more of the other primary colors at a particular location on the receiver member to form a color different than the specific color toners combined at that location.

Figure 2A:
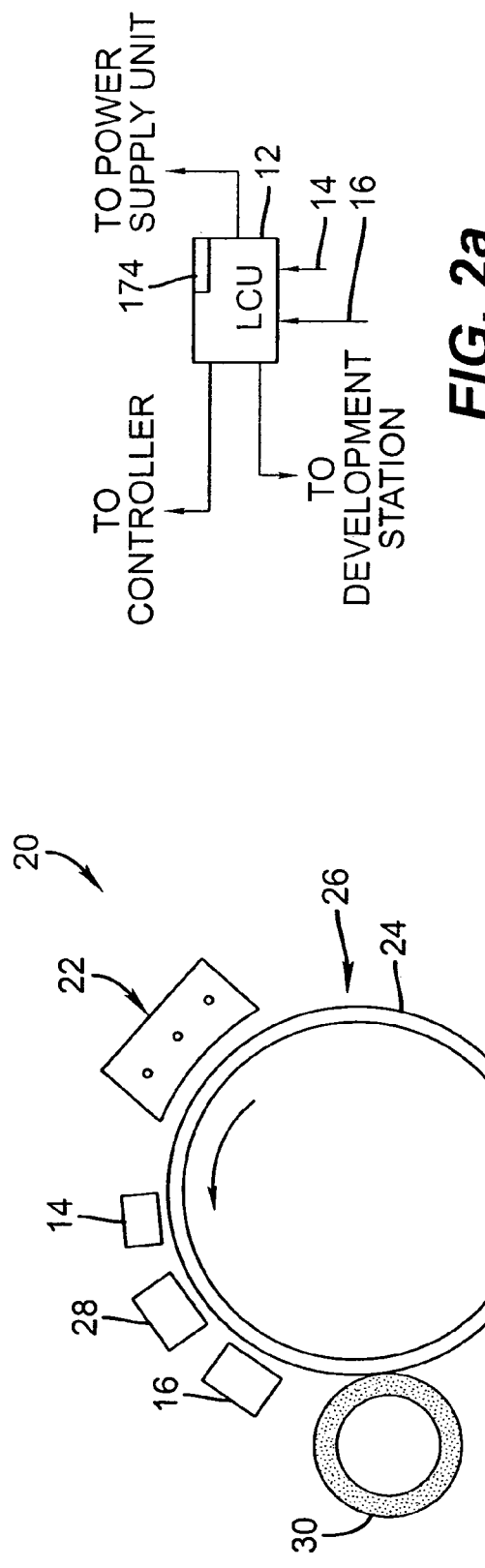
FIGS. 2A and 2B are schematic illustrations of a representative printing assembly or module used in the print engine apparatus of FIG. 1 showing additional details.

FIG. 2A shows a Logic and Control Unit (LCU) 12 which could be one or more computers, or simply a processing device or portion thereof, acting in response to signals from various sensors associated with the apparatus and provide timing and control signals to the respective components to control the various components and process control parameters of the apparatus in accordance with methods well known by those skilled in the arts. Printer 10 includes a controller or logic and control unit (LCU) 12, preferably a digital computer or microprocessor operating according to a stored program for sequentially actuating the workstations within printer 10, effecting overall control of printer 10 and its various subsystems. LCU 12 also is programmed to provide closed-loop control of printer 10 in response to signals from various sensors and encoders. Aspects of process control are described in U.S. Pat. No. 6,121,986 incorporated herein by this reference.

The LCU 12 includes a microprocessor and suitable tables and control software which is executable by the LCU 12. The control software is preferably stored in memory associated with the LCU 12. Sensors associated with the fusing and glossing assemblies provide appropriate signals to the LCU 12 when the glosser is integrated with the printing apparatus. In any event, the glosser can have separate controls providing control over temperature of the glossing roller and the downstream cooling of the fusing belt and control of glossing nip pressure. In response to the sensors, the LCU 12 issues command and control signals that adjust the heat and/or pressure within fusing nip (not shown) so as to reduce image artifacts which are attributable to and/or are the result of release fluid disposed upon and/or impregnating a receiver member that is subsequently processed by/through a finishing device such as a glossing assembly (not shown). Additional elements provided for control may be assembled about the various module elements, such as for example a meter 14 for measuring the uniform electrostatic charge and a meter 16 for measuring the post-exposure color within a patch area of an image area on the printed surface.

Figure 2B:
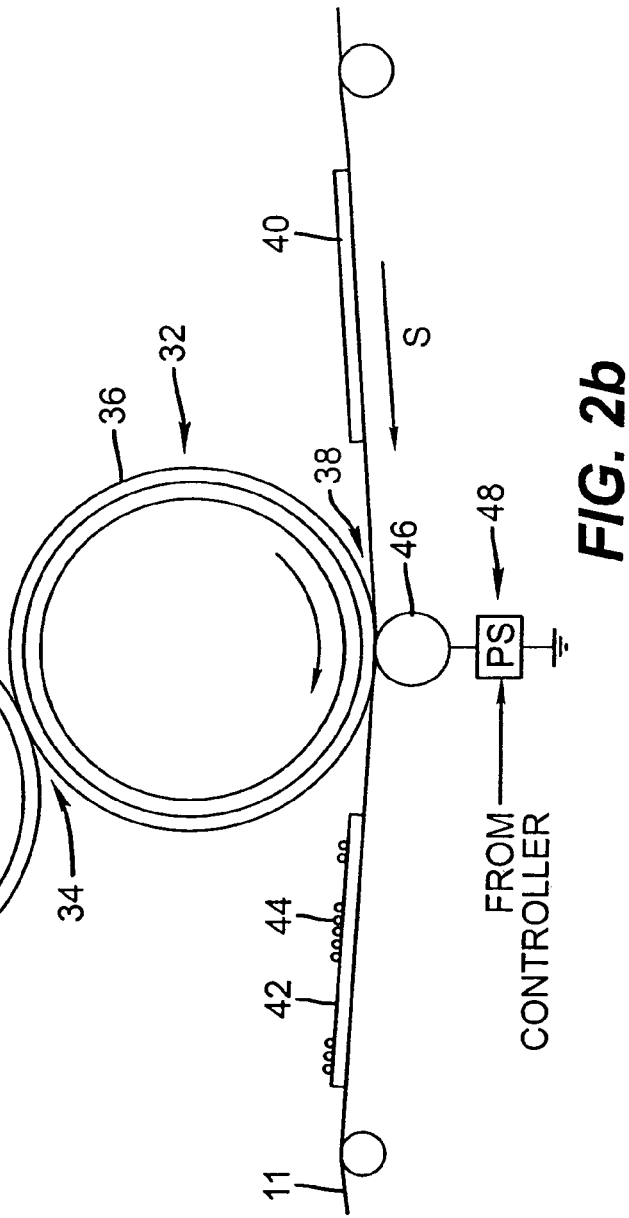

FIG. 2B shows a representative color-printing module. Each color-printing module 20 of the printer apparatus includes a plurality of electrophotographic imaging subsystems for producing a respective single-color toned image. Included in each module is a primary charging subsystem 22 for uniformly electrostatically charging a surface 24 of a photoconductive imaging member 26, shown in the form of an imaging cylinder. Also included is an exposure subsystem 28 for image modulation of the uniform electrostatic charge by exposing the photoconductive imaging member to form a latent electrostatic color separation image in the respective color; a development subsystem 30 for toning the exposed photoconductive imaging member with toner of the respective color; an intermediate transfer member 32 for transferring the respective color separation image from the photoconductive imaging member through a transfer nip 34 to the surface 36 of the intermediate transfer member 32, and through a second transfer nip 38 from the intermediate transfer member to a receiver member (receiver member 40 shown prior to entry into the second transfer nip 38. Also shown is receiver member 42, shown subsequent to the transfer of the toned color separation image after receiving the respective toned color separation images 44 in superposition to form a composite multicolor image thereon. An electrostatic field provided to a backup roller 46 from a power source 48 effects transfer to the receiver member. All the modules are substantially identical to the above-described module. Some of the modules transfer a type of pigmented toner and others non-pigmented toner, such as a clear toner or some other transfer material or a combination of pigmented and non-pigmented toner.

In an alternative embodiment, the photoconductive imaging member 26 can alternatively have the form of an endless web, and the intermediate transfer member 32 may also be an endless web, although it is preferred to be a compliant roller of a well-known type. The exposure device may include a Light Emitting Diode (LED) writer or laser writer or other electro-optical or optical recording element. Charging device 22 can be any suitable device for producing uniform pre-exposure potential on photoconductive imaging member 26, the charging device including, for example, any type of corona charger or roller charger. A cleaning device may be associated with the surface 24 of the photoconductive image recording member, and another cleaning device may be associated with the surface 36 of the intermediate transfer member after respective transfer of the toned images. Still other forms of electrostatographic recording apparatus may be used to form the multicolor image, and such apparatus need not have the color assemblies arranged in a tandem form as described herein.

The electrostatic image is developed, preferably using the well known discharged area development technique, by application of pigmented marking particles to the latent image bearing photoconductive drum by the respective exposure subsystem 28, which development subsystem 30 can employ Small Particle Dry (SPD) developers. A suitable voltage, to develop the respective latent image, electrically biases each of the development assemblies. The voltage may be supplied by a power supply or by individual power supplies (not illustrated). Preferably, the respective developer is a two-component developer that includes toner marking particles and magnetic carrier particles. Each color development assembly has a particular color of pigmented toner marking particles associated respectively therewith for toning. Thus, each of the modules, M1 through M4, creates a different color marking particle image on the respective photographic drum. Alternatively, the developer may be a single-component developer. It is also contemplated that the color toners may each be associated with a liquid developer. As will be discussed further below, a clear toner development assembly may be substituted for one of the pigmented developer assemblies so that the fifth module operates in similar manner to that of the other modules which deposits pigmented toner; however, the development assembly of the clear toner module has toner particles associated respectively therewith that are similar to the toner marking particles of the color development assemblies but without the pigmented material incorporated within the toner.

As indicated above, the color printer can employ four different colorants (cyan, magenta, yellow, black), three different colorants (red, green, blue), or multiple colorants (cyan, magenta, yellow, black, red, green, blue) to form variety of colors. These colorants represent CMYK colors, RGB colors or multiple colors in device-dependent color space. This means that color generated or displayed within these spaces are directly linked to a specific printer, ink, media, reproduction process or combination thereof. The RGB space of one manufacture monitor may be different than that in the RGB space of another manufacture monitor. The CMYK space of one manufacture-printing device may be different from the CMYK space of another manufacture-printing device. These CMYK, RGB, or multiple colors may be characterized by its lightness, saturation, and hue. One commonly used color measurement system is the device-independent color space CIELAB also known as the LAB response wherein the "L" represents the lightness of the color, the "a" represents the location of the color on a spectrum from red to green, and the "b" represents the location of the color on a spectrum from yellow to blue. The "a" and "b" taken together represent the saturation and hue of the color. Note that the notation $L^* a^* b^*$ will also be used to refer to individual coordinates of the LAB color system.

The color printing system needs to be calibrated and characterized for accurate color reproduction. These include setup of the printer to the specification for each color separation and printed large number of test patches to construct proper color transformation. The color transformation that characterizes the printing system maps color between device-dependent color and device-independent color. The system is capable of both forward and backward transformations, as for example, between a device dependent color coordinate system (i.e. CMYK or RGB) to a color device independent profile connection space (PCS) such as LAB. This could include transforms such as LAB to RGB or CMYK as well as RGB or CMYK to LAB. The color transforms can be stored in a look-up table (LUT) format, in general, for easy access in processing color data. The International Color Consortium (ICC) color profile, which characterizes the printing system, contains multiple color transformation tables in a LUT or other format, such as in a mathematical and/or graphical format.

In digital era, the original scene is captured through digital camera instead of film. The characteristics of digital camera are not the same as the characteristics of the film. Different image capture medium and underneath image printing process has resulted prints with different look especially compared to CMYK color printing press of electrophotographic process with the traditional photographic printing process. The different look between CMYK electrophotographic color printing press and photographic printing process are essentially caused by two different means of color reproduction process. There is a need to have CMYK electrophotographic color press prints with a similar look as the photographic printing process. This invention involves a process using multiple color transforms (or ICC profiles) pre-loaded into color management system to generate multiple look-and-feel as customer selects. These processes bring in and joint together traditional photographic printing process with electrophotographic printing process to deliver superior photographic quality prints on electrophotographic process.

FIG. 3 represents some of the steps that are used in the color print enhancement system which is a method for enhancing a digital image which was captured by an image capture device and which is to be printed on a printer which forms monochrome or color images on a receiver 40. FIG. 3a illustrates the steps of receiving an RGB input device profile of input device picture elements 50, such as RGB-encoded picture elements, from a digital image 52 captured by a capture device 54. The RGB-encoded picture elements 50 are transformed using a RGB input device profile 56 into profile connection space (PCS) encoded picture elements 58 confined by the input device. Similarly FIG. 3d illustrates the steps of taking the LAB-encoded picture elements 58 and transforming the elements of the digital picture 52 using an output device profile 62 into output device picture elements 64.

Figure 3E:
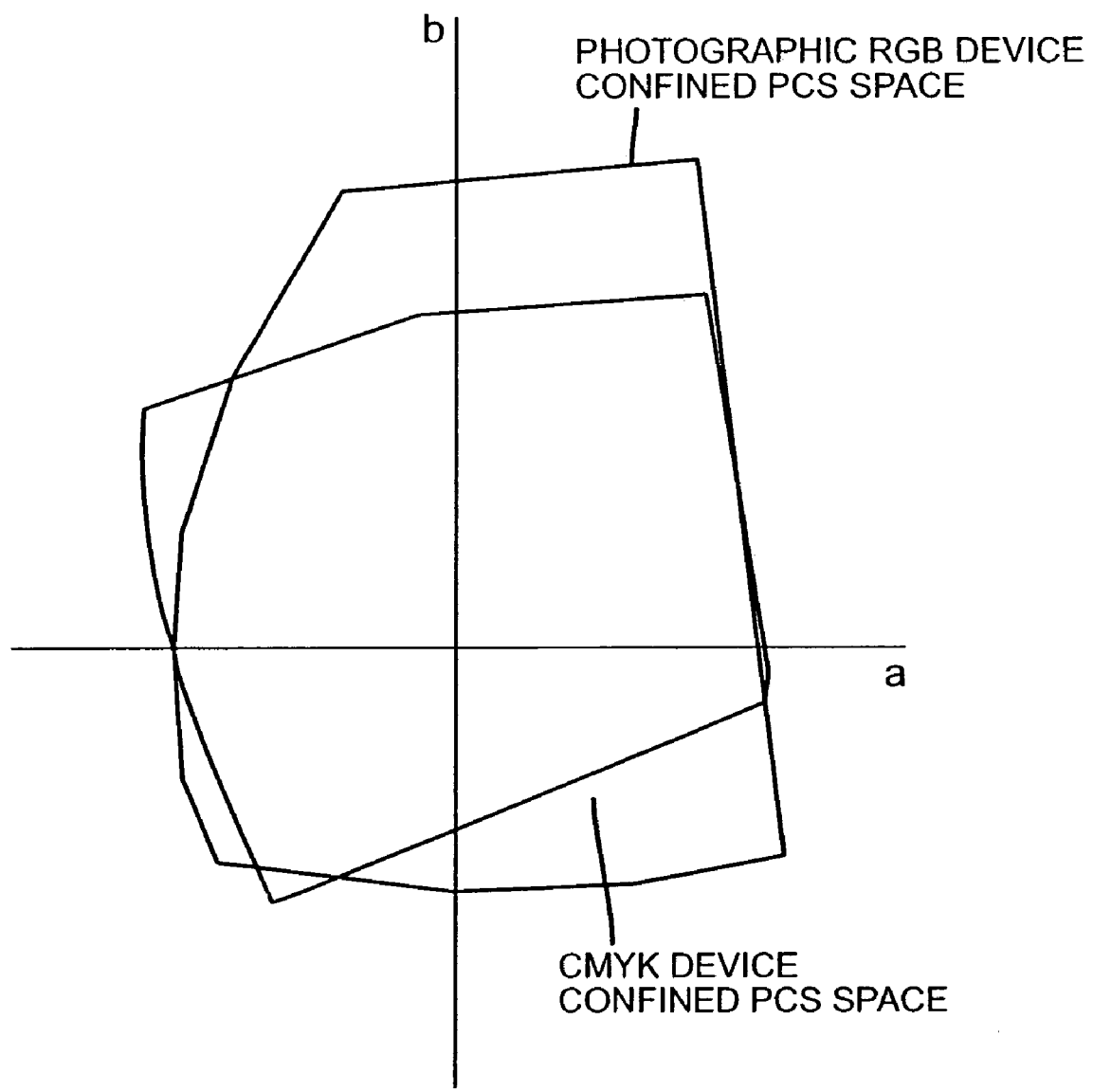
FIG. 3 illustrates portions of the invention.
Figure 5:
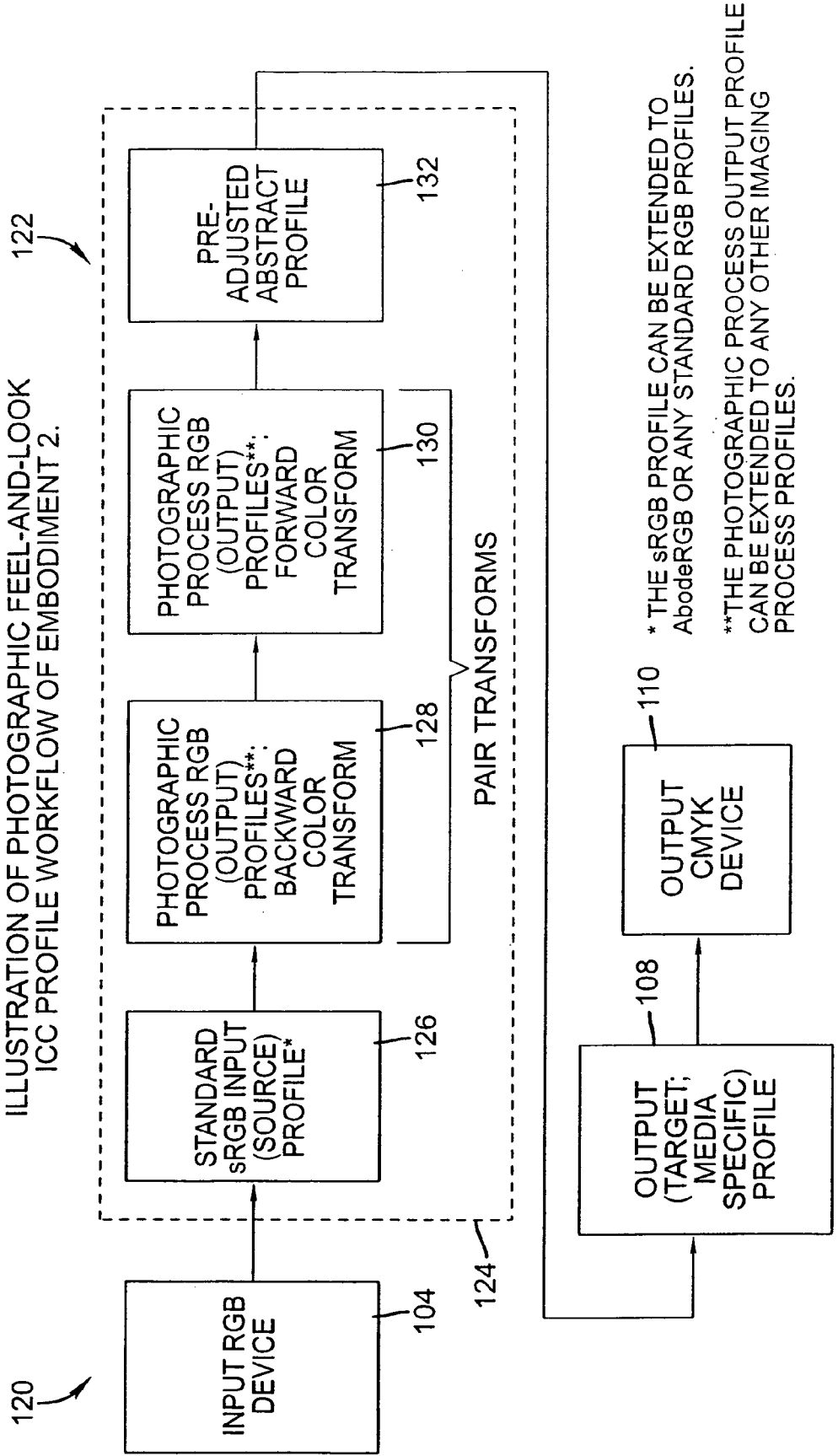
FIG. 5 is a flow chart illustration of a process steps according to one aspect of the invention.

FIG. 3b illustrates transforming the LAB-encoded picture elements 58 in confined profile connection space (PCS) using a pair of transforms selected from the plurality of photographic process device RGB transforms 60, for example as shown as 128 and 130 in FIG. 5. These selected transforms convert the encoded picture elements in one confined profile connection space (PCS) into PCS encoded picture elements 66 of a photographic-type process confined PCS space. An example of these confined spaces and the different shapes they can take is graphically illustrated in FIG. 3e.

After the input device confined PCS is transformed into another PCS encoded picture elements 66 of photographic process confined PCS space the digital image 50 is enhanced and adjusted using an abstract profile as shown in FIG. 3c to enhance the PCS encoded picture elements 58 of the photographic process confined PCS space. The digital image can be further enhanced, if necessary by correcting the PCS encoded picture elements transformed digital image to produce a new digital image which is corrected for color and tonal reproduction when printed from the printer (on that receiver with that finish) before using the printer to print the corrected transformed digital image by the printer on that receiver with that finish. The abstract profiles can include a luminance (L*) stretched profile, a chroma saturated profile, a white point adjusted profile and a color memory color match, as discussed in pending application Ser. No. 11/262,142 by the assignee for a Color Enhancement Method and System. The abstract profiles can also include a primary color match profile, a clear-coat color compensation profile and a hue consistency profile for an example. Other color and device correcting profiles could also be used alone or in combination with these abstract correction profiles.

Figure 4:
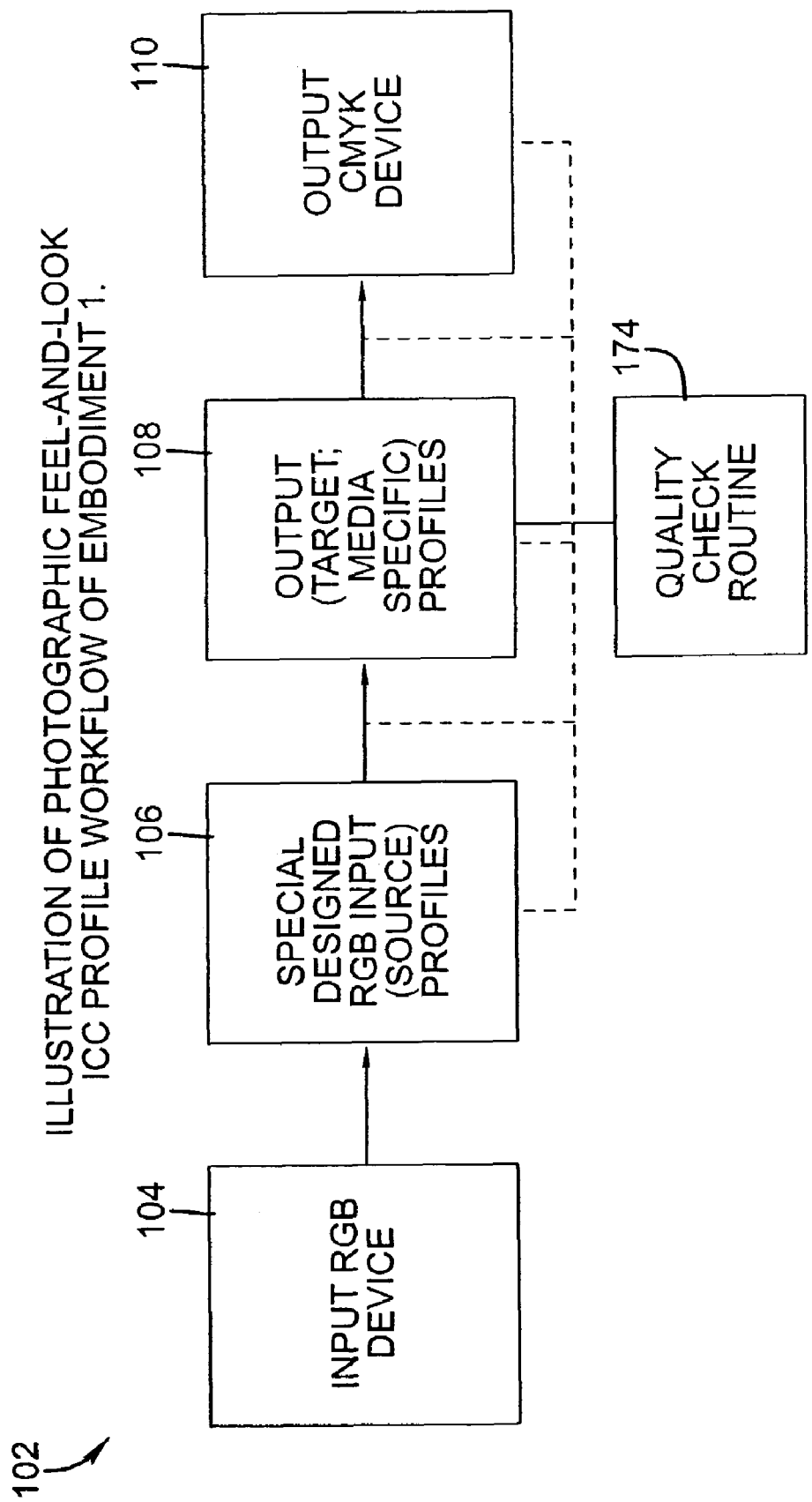
FIG. 4 is a block diagram of the color print enhancement system.

FIG. 4 describes the color print enhancement method and system. The automatic color enhancement system 102 is performed as shown in the process steps of input from RGB device 104, using new, specially designed RGB input profiles 106 that will result in the desired look and feel, transforming to an output or target, media-specific profile 108 and then printing on an output CMYK device 110. A quality check routine 109 can be inserted to check the results at any point and appropriate corrective action taken if necessary. One skilled in the art would understand that all the steps involved could be programmed to occur automatically or combined with suitable operator interface controls. This method and related system uses the special ICC profiles to capture the traditional photo-like "look-and-feel" including the color and tone scale when printed on a printer, such as a the electrophotographic process media ICC profile. The "look-and-feel includes a color reproduction point of view that includes combining photographic process and electrophotographic process of particular color look with specific color transforms (or ICC profiles) and also includes the properties of the receivers and the surface treatments that results in different finishes, thereby contributing to the look-and-feel. All of these factors are incorporated into the color print enhancement system which includes specific ICC profiles that capture the characteristics of photographic process as well as abstract profiles for adjustments that take into account processing conditions such as overcoating with clear dryink in the $5^{th}$ color module to give a surface texture and/or fusing to give a selected gloss.

Various standardized RGB color spaces can be used to ensure the interoperability among various image-capturing devices and image display devices such as monitors and printers but this does not result in a photographic look-and-feel. The specially designed input profiles in conjunction with the abstract profiles discussed below, in conjunction with the input RGB device profiles, such as sRGB and others, will result in a photographic look-and-feel. This photographic look-and-feel will also be selectable and adjustable and correctable to result in the customer selected and preferred photographic appearance that would have been available using the traditional graphic art process because different sets of colorants are adopted, which, in turns, results in certain colors traditionally reproducible by only one process. The photographic process RGB profile (forward color transform) is applied to represent the reproduced photograph in the ICC PCS (Profile Connection Space) color space. One approach to reproduce all color represented in the PCS; however, this approach results in only colors reproducible by both processes. Color artifacts will be apparent such as color contour and loss of color saturation. Since the characteristics of the output graphic art CMYK printing device is know, the adjustable abstract profile, discussed below, is used to connect between the photographic process RGB profile and the output profile such that the final reproduced images are free of any artifacts noted previously.

FIG. 5 shows one embodiment of the system and related method 120. The enhancement in this embodiment is shown in the processor 122 as steps 124, which can replace 106 of FIG. 4, including 126, 128, 130, 132, 108 and 110 for applying the pre-adjusted abstract profiles which can include pre-adjusted abstract profiles including L* stretched profiles, chroma saturated profiles, white point adjusted profiles, color memory color match profiles, primary color match profiles, clear-coat color compensation profiles and hue consistency profiles as well as others. For 128 and 130, these refer to an output profile built to describe the color reproduction of an output digital silver-halide photographic printer (for example, the Kodak Professional RP30 Laser Printer using Kodak Professional Supra Endura paper).

Step 128, shows the use of a perceptual rendering intent with the profile's output transform (B2A0, i.e., PCS-to-RGB perceptual). This replicates the output ICC color management operation of a digital photographic workflow. Box 130 shows a preferred embodiment will use the calorimetric rendering intent with the profile's input transform (A2B1, i.e., RGB-to-PCS calorimetric). This allows the color print enhancement method and system to precisely match in the new input profile's rendering aim the calorimetric results produced by the perceptual rendering of the original photographic output profile. Box illustrating step 132 allows the system and related method to add additional preferred adjustments to the rendering aims in the new input profile, which is shown as 106 in FIG. 4 and as 124 in FIG. 5. This can be effective, for example, to darken and rotate the hues of the RGBCMY "pure" primaries reproduction, without affecting the majority of the photographic color space defined by the combination of the Standard sRGB input profile and the profile transforms from 128 and 130.

Figure 6:
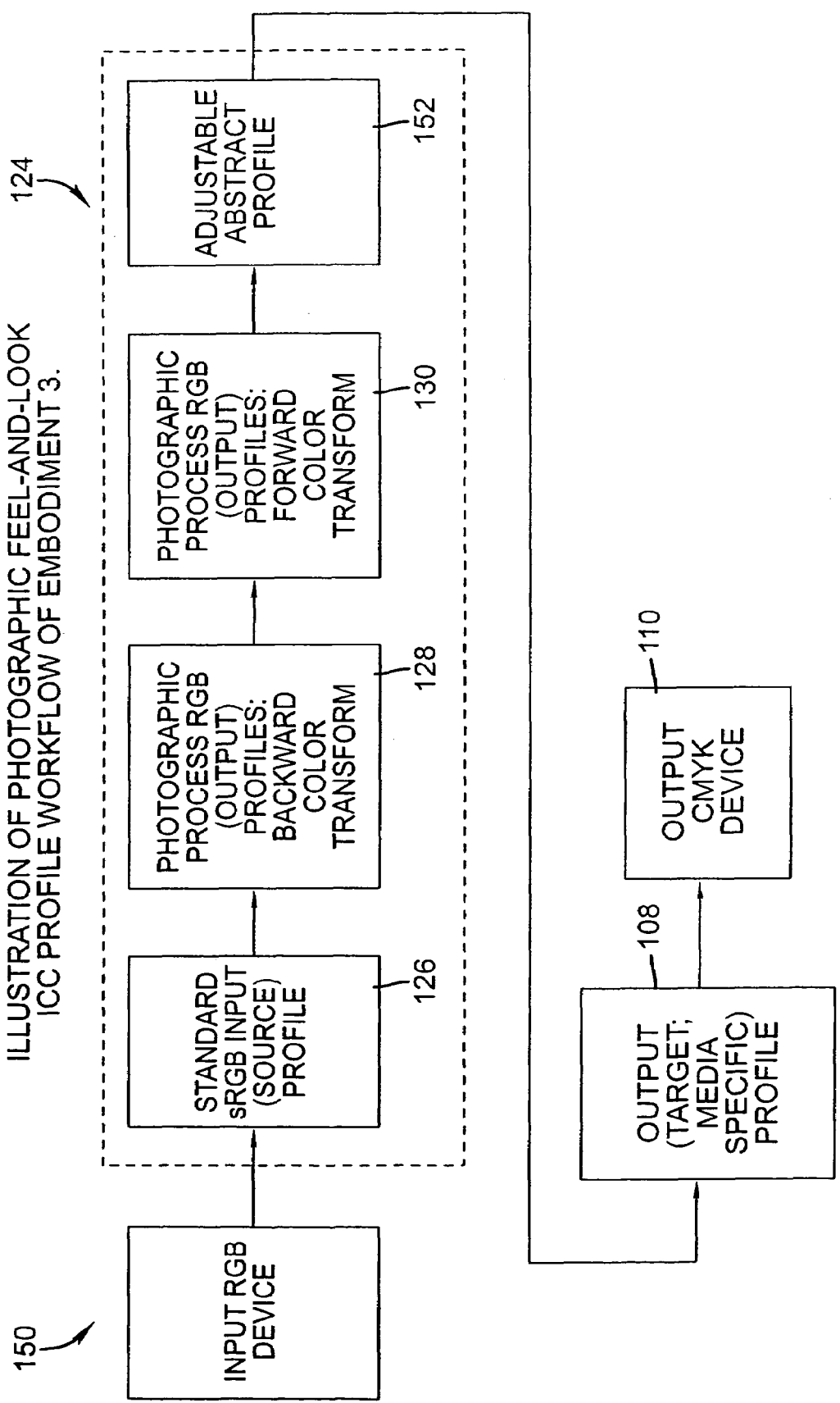
FIG. 6 is a flow chart illustration of a process steps according to another aspect of the invention.
Figure 7:
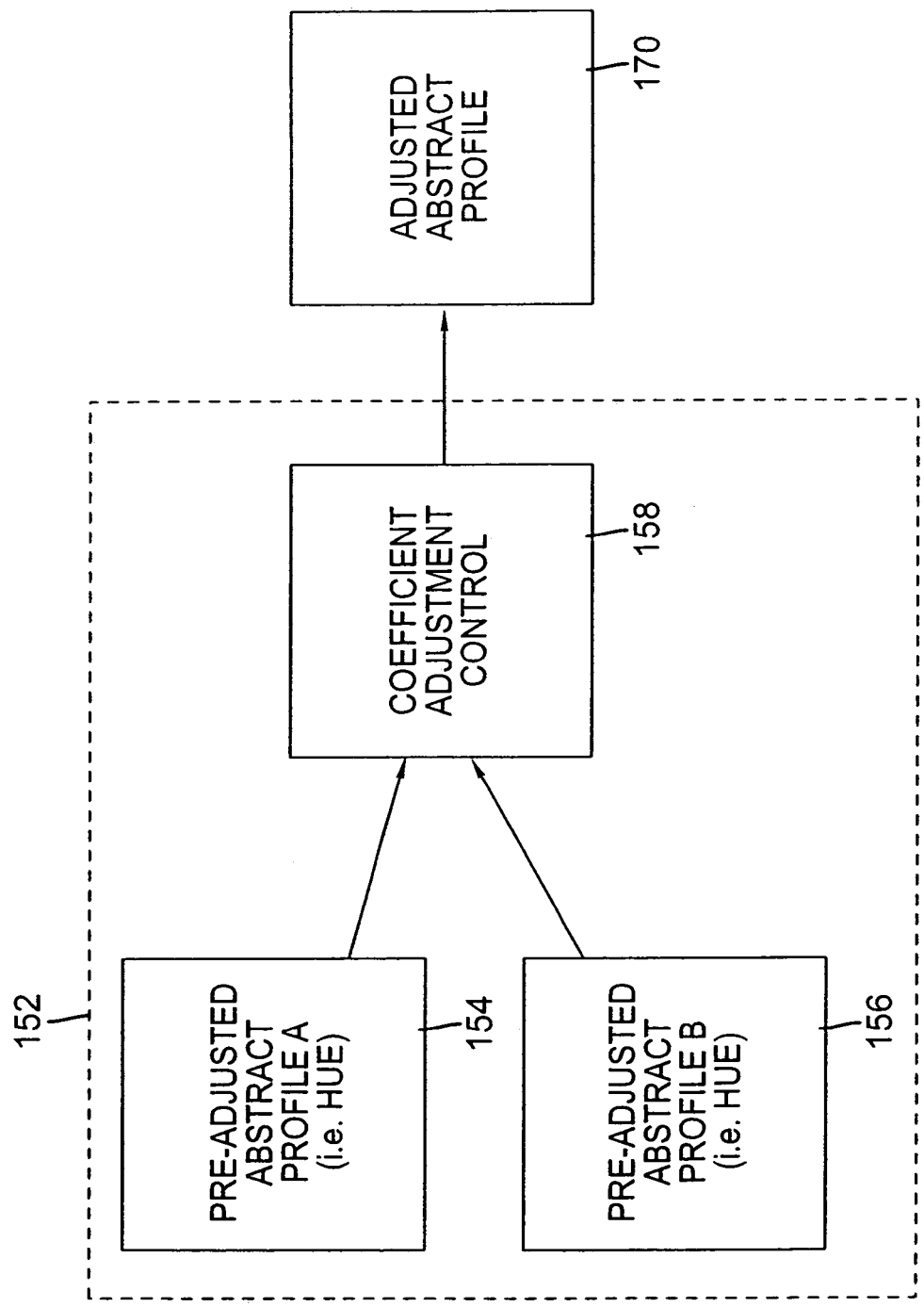
FIG. 7 is a detail of flow chart illustration of one portion of the process steps according to the aspect of the invention shown in FIG. 6.
Figure 8:
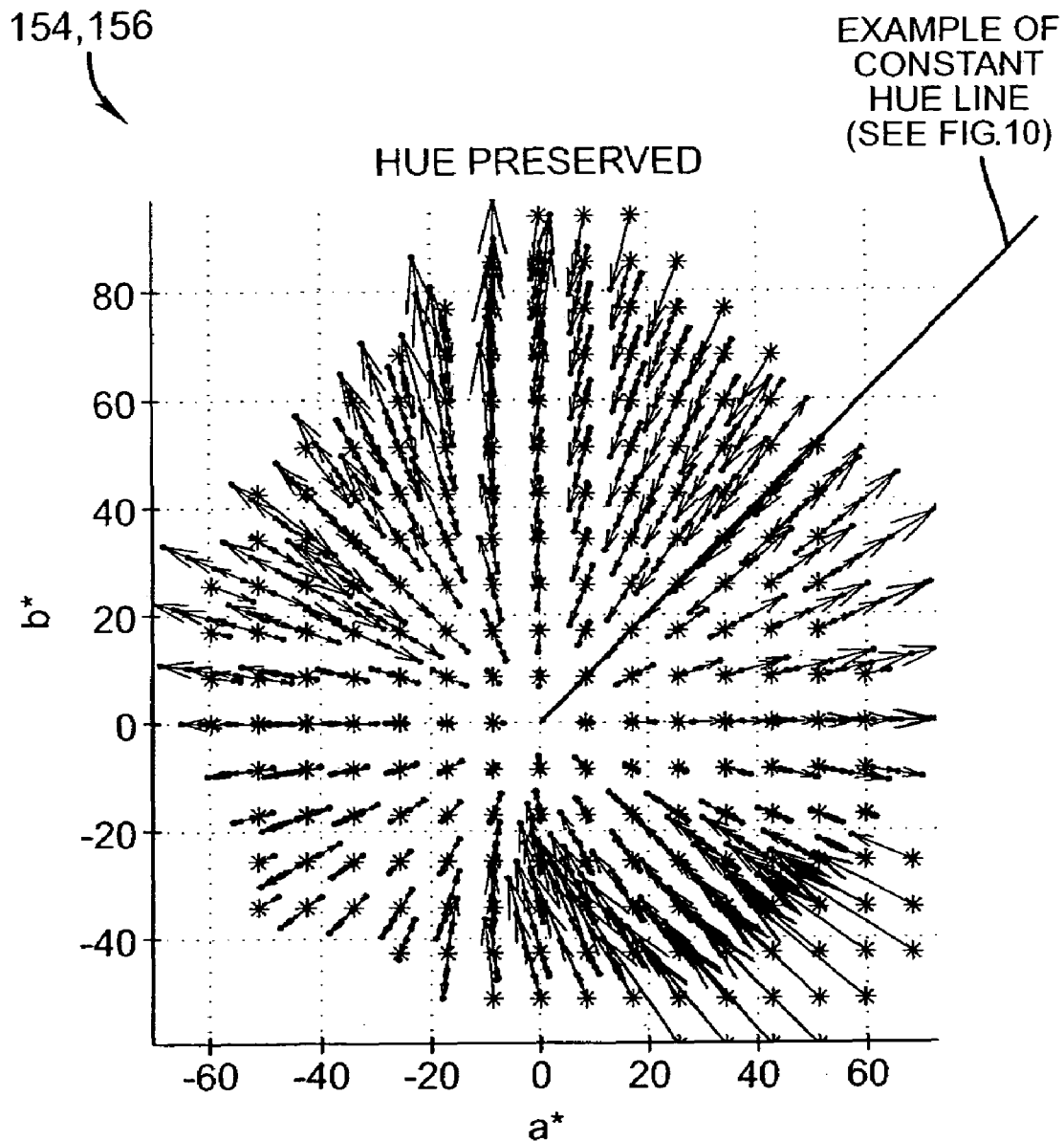
FIGS. 8 and 9 are illustrations of a pre-adjusted abstract profile for hue according to the invention illustrated in FIGS. 6 and 7.
Figure 9:
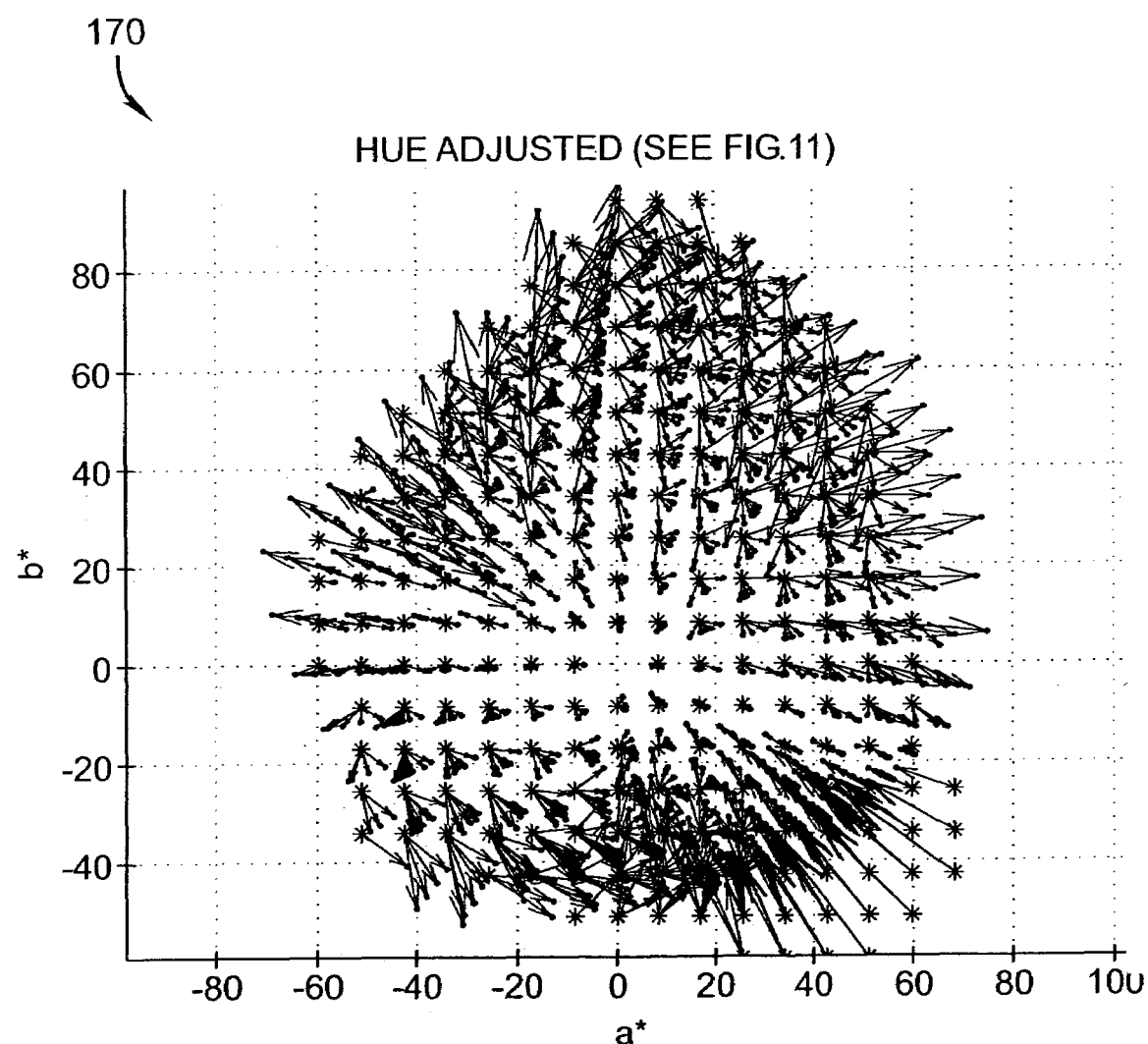

FIG. 6 shows another embodiment of the system and related method 150. The enhancement in this embodiment is shown in the processor 122 as discussed above but instead of applying the pre-adjusted abstract profiles 132 the system and related method applies one or more adjustable abstract profiles 152. An example of the adjustable abstract profiles and method of making them 152 is illustrated in FIG. 7. Shown are two hue pre-adjusted profiles 154, 156 (an example is illustrated in FIG. 8) that are controlled by a coefficient adjustment control 158 to produce an adjusted abstract profile 170, as shown in FIG. 9.

Figure 10:
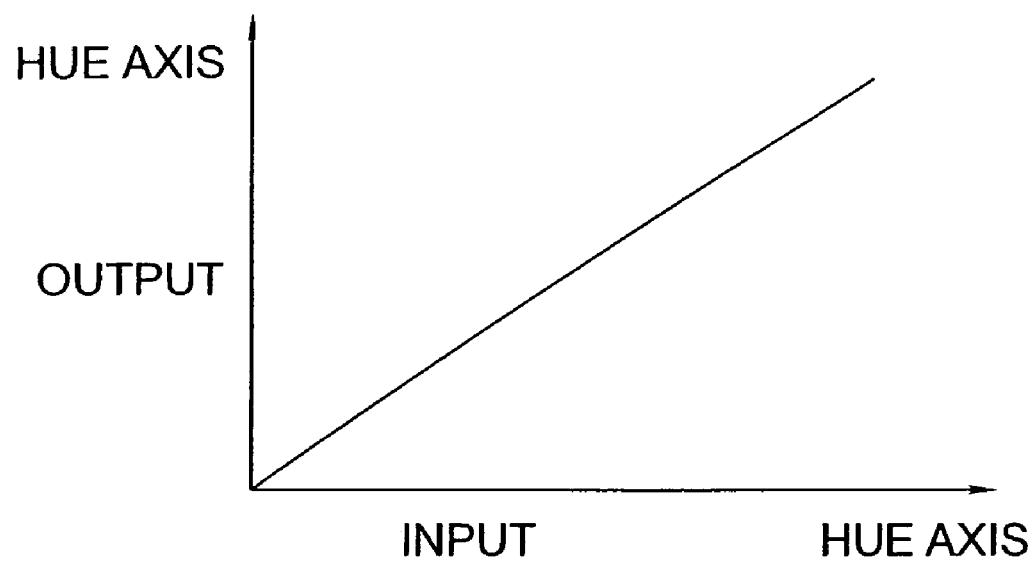
FIG. 10 is a 2-D illustration of preserving hue mapping according to the invention illustrated in FIG. 6.
Figure 11:
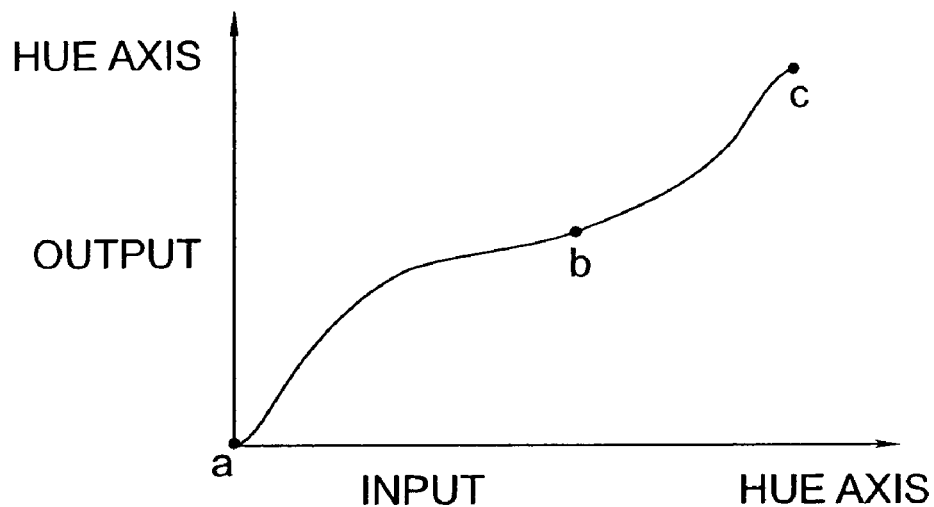
FIG. 11 is a 2-D illustration of enhancing hue mapping according to the invention illustrated in FIG. 6.
Figure 12:
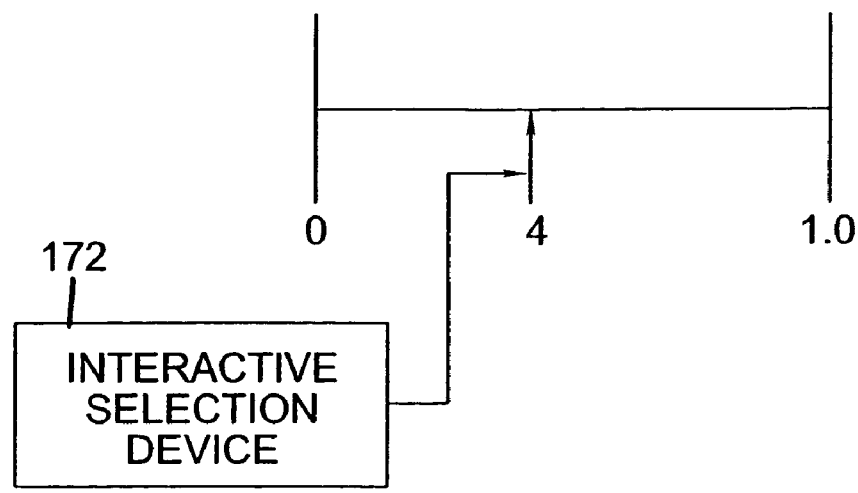
FIG. 12 is an illustration of a selection for hue mapping according to the invention illustrated in FIG. 6.

In this example the hue that is normally transformed as shown in FIG. 10 is allowed to be "adjusted" to allow a hue, such as red, to be enhanced as shown in FIG. 11. This can be performed using a sliding scale that is connected to an interactive device 172, as shown in FIG. 12. The scale illustrates the selection device and is shown having a range from 0 to 1.0 but one could have any suitable range. In this example the 0 represents the linear mapping graphically illustrated in FIG. 10. The 1.0 represents the non-linear mapping graphically illustrated in FIG. 11 and thus the selection could range from one to the other in a seamless manner. Anything in between 0 and 1.0 could be selected using the interactive selection device, or an automated method resulting in a changes "look and feel." FIG. 12 shows a selection of 0.4 or 40 percent of the total displacement thus resulting in something closer to the linear mapping then the adjusted mapping.

Figure 13:
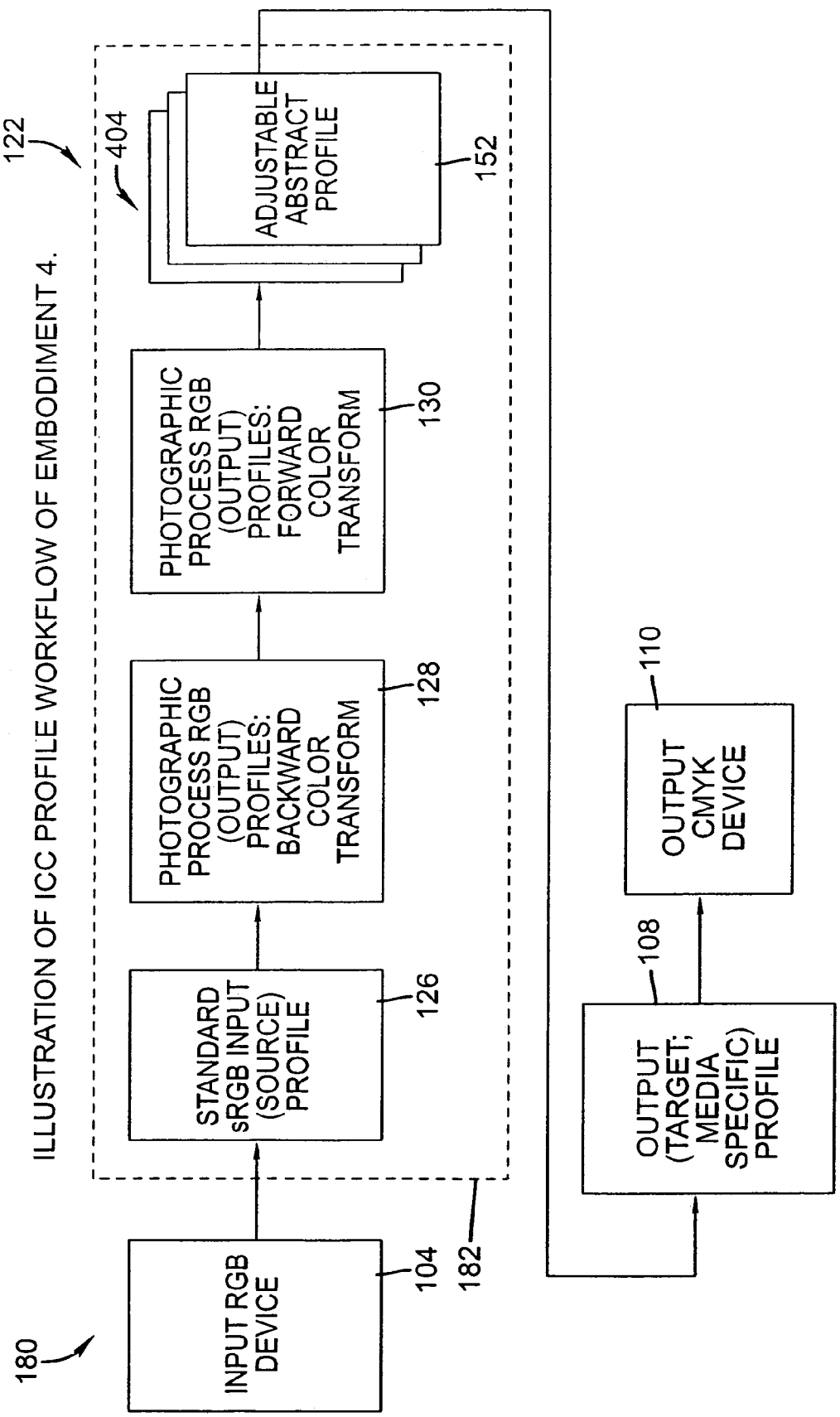
FIG. 13 is a flow chart illustration of a process steps according to another aspect of the invention.
Figure 14:
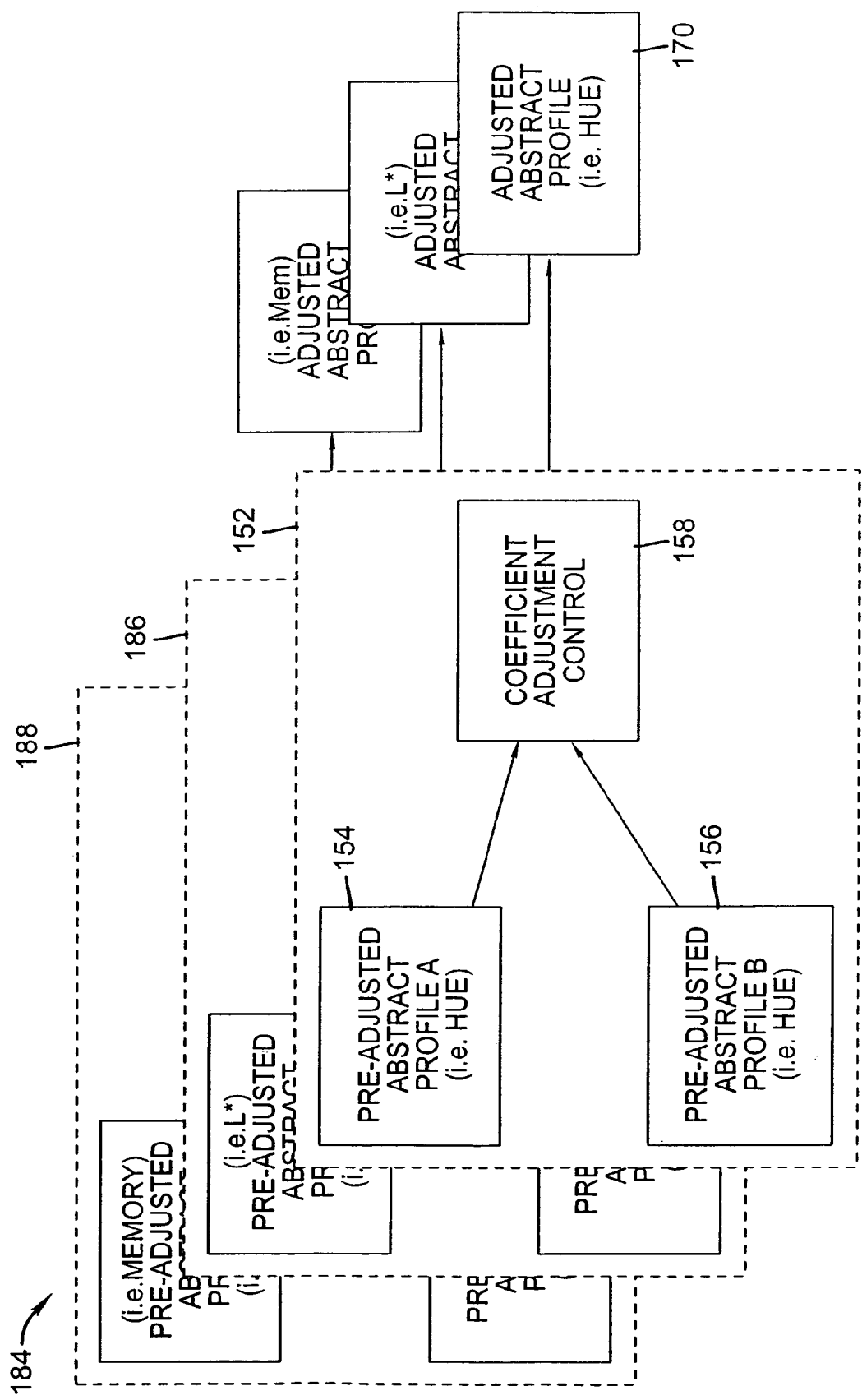
FIG. 14 is a detail of flow chart illustration of one portion of the process steps according to the aspect of the invention shown in FIG. 6.

FIG. 13 shows another embodiment of the system and related method 180. The enhancement in this embodiment is shown in the processor 122 as steps 182 including 126, 128, 130, 184, 108 and 110 for applying more then one adjustable abstract profile, which can include the adjustable abstract 152 for hue, discussed in conjunction with FIGS. 6 and 7. As discussed above the abstract profiles can includes L* stretched profile, chroma saturated profile, white point adjusted profile, color memory color match, as discussed in co-pending application Ser. No. 11/262,142 for a Color Enhancement Method and System, a primary color match profile, a clear-coat color compensation profile and a hue consistency profile for an example. Other color and device correcting profiles could also be used alone or in combination with these abstract correction profiles. These are each adjusted and can be balanced between them to produce the desired look and feel desired and selected by the customer.

A tradeoff exists when connecting a photographic process to a graphic art printing process such as hue constancy, luminance/contrast maintenance, color saturation and memory-color reproduction. It is oftentimes not possible to satisfy demand of all customers by using one connecting abstract profile. As a result, the embodiments described above in conjunction to FIGS. 6 and 7, as well as 13 and 14 below, propose to prepare an array of abstract profiles with varying degrees of parameters controlling different appearance. Users are given with a control nub or selector to select their own preferred realization. The selection can be discrete or continuous as will be discussed below and shown in FIG. 12.

Currently in commercial printing generally four or five colorants are used individually or simultaneously to represent the desired color. If another look and feel is needed the digital image can be printed with an overcoat in the print engine or in a separate stand-alone coating device using a clear dry ink. The image capture device can be a digital camera or other capture device such as a camera, phone, imager or video device. The printer can be an ink jet printer, an electrophotographic printer, a plate processor or other device capable of printing an image on a receiver including materials such as glass, plastic, cells, paper, cloth and metal, such as a powder coating device. This can be done in conjunction to an electrophotographic printer, or other printer, such as an inkjet or plate printer for printing on receivers using a print engine to print a digital image on a substrate, said printing being performed in accordance with initial printing settings and selections from a plurality of transforms to generate prints on the receiver with multiple look-and-feel finishes from a digital image which was captured by an image capture device including an input device, a processor and a print engine.

The input device 54 for receiving an RGB input device profile from a digital image 52 captured by a capture device using RGB-encoded picture elements. The LCU or processor 12 is used in conjunction to the steps described above to transform RGB encoded picture elements using RGB input device profile into profile connection space (PCS) encoded picture elements confined by the input device. One or more pairs of transforms is selected from the plurality of photographic process device RGB transforms and used to convert the transformed PCS encoded picture elements of input device confined PCS into another PCS encoded picture elements of photographic process confined PCS space, thus enhancing the PCS encoded picture elements of photographic process confined PCS space by adjusting the PCS encoded picture elements of primary colors in the photographic process confined PCS space; and determining corrective action. This results a new digital image, which is corrected for color and tonal reproduction when printed from the printer (on that receiver with that finish). The print engine prints the corrected transformed digital image on the receiver. The printer can also use the selection device 172 to select one of a plurality of finishes for a particular look and feel. The processor 12 can be further adapted to perform a quality control function to determine corrective action when the calculated color metric difference falls outside an expected range.

Another embodiment of the method for enhancing a digital image which was captured by an image capture device and which is to be printed on a printer which forms monochrome or color images, on a receiver, includes the steps of: a) providing a plurality of color and tonal transforms, each such transform being unique to a receiver finish and which corrects color for a digital image captured by the capture device using RGB-encoded picture elements for one or more surface conditions to give a photographic look and feel when printed by the printer; b) selecting a pair of transforms, including one backward and one forward color transform from the plurality of transforms and using such selected transform to transform the digital image into a digital image represented in profile connection space (PCS); c) adjusting the transformed digital image in PCS space based on one or more abstract color profiles to produce a new digital image in PCS space which is corrected for color and tonal reproduction when printed from the printer on that receiver with that finish; d) using the printer to print the corrected transformed digital image by the printer on that receiver with that finish; and f) repeating steps b), c), and d) until a user acceptable print is produced.

The method for controlling a color reproduction device using the color print enhancement system uses multiple color transforms pre-loaded into a color management system to generate prints on a receiver with multiple look-and-feel finishes from a digital image which was captured by an image capture device comprising the steps of providing a plurality of color and tonal transforms, each such transform being unique to a receiver finish and which corrects color for a digital image captured by the capture device using RGB-encoded picture elements for one or more surface conditions to give a photographic look and feel when printed by the printer. Then selecting from multiple look-and-feel finish selections including a color metric and selecting a pair of transforms from the plurality of transforms and using such selected transform pair to transform the digital image to achieve the look-and-feel finish before correcting the transformed digital image to produce a new digital image which is corrected for color and tonal reproduction when printed from the printer on that receiver with that finish by calculating a color difference between the current color metric and a nominal expected color metric for that print job on the receiver with the finish selected. After the adjustments are attempted then a quality check 174 determines if the calculated color difference falls inside an expected range and corrects the transformed digital image to produce a new digital image which is corrected for color and tonal reproduction when printed from the printer on that receiver with that finish as needed by readjusting using the adjustment abstract profiles as needed before using the printer to print the corrected transformed digital image by the printer on that receiver with that finish. The above steps can be repeated as needed to achieve the desired results so that a user acceptable print is produced. Various surfaces can result from the paper finish itself or from various treatments before or during printing, such as a applied gloss or overcoat and these surface conditions will change the final look and may need additional adjustments as discussed above. Since the Color Print Enhancement system can handle various surface treatments and conditions it is well suited to different paper receivers with different finishes as well as other receivers such as glass, textiles, metals as well as other toners, such as powder paints.

Note that the types of color profiles designed for optimum photo performance of output with one profile tuned for closest reproduction of professional photographic paper tonescale, color balance, hue and saturation and a second profile tuned for tonescale simulation of photo output but with higher saturation in primaries for consumers and professionals who prefer images with greater 'pop' capable on the press. The processor can automatically select the optimum transform(s) to achieve a photographic look and feel for that receiver and combining the cumulative captured measurements from prior selections. The system can include a transmitter for transmitting some or all of the related information to one or more of a remote proofing devices, including calibrated monitors (soft proof) and proof printers (hard proof), for quality assurance use by remote users and use a user interactive device.

All of the embodiments discussed above-described color correction processes to automatically correct process-sensitive colors, such as memory sensitive colors, using the steps discussed. All or some of these steps can be stored in the printer's LCU memory. It would be clear to one skilled in the art that some of these steps could be replaced with suitable operator interactive controls.

Although the invention has been described and illustrated with reference to specific illustrative embodiments thereof, it is not intended that the invention be limited to those illustrative embodiments. Those skilled in the art will recognize that variations and modifications can be made without departing from the true scope and spirit of the invention as defined by the claims that follow. It is therefore intended to include within the invention all such variations and modifications as fall within the scope of the appended claims and equivalents thereof.

PARTS LIST

M1-M5 color tone modules
10 printer apparatus
11 transport web
12 logic control unit (LCU)
14 meter
16 meter
20 color printing module
22 primary charging subsystem
24 surface
26 photoconductive image member
28 exposure subsystem
30 development subsystem
32 transfer member
34 transfer nip
36 surface
38 second transfer nip
40 receiver member
42 receiver member
44 separation images
46 backup roller
48 power source

The invention claimed is:

1. A method for enhancing a digital image which was captured by an image capture device and which is to be printed on a printer which forms monochrome or color images, on a receiver, comprising the steps of:
   a. receiving an RGB input device profile from a digital image captured by a capture device using RGB-encoded picture elements;
   b. transforming RGB encoded picture elements using RGB input device profile into profile connection space (PCS) encoded picture elements confined by the input device;
   c. selecting a pair of transforms from the plurality of photographic process device RGB transforms and using such selected paired transforms to convert the transformed PCS encoded picture elements of input device confined PCS into another PCS encoded picture elements of photographic process confined PCS space;
   d. adjusting the PCS encoded picture elements of colors in the photographic process confined PCS space;
   e. correcting the PCS encoded picture elements transformed digital image to produce a new digital image which is corrected for color and tonal reproduction when printed from the printer on a receiver with a finish; and
   f. using the printer to print the corrected transformed digital image by the printer on that receiver with that finish.

2. The method of claim 1 further comprising overcoating with a clear dry ink.

3. The method of claim 1 wherein the image capture device is a digital camera.

4. The method of claim 1 wherein the printer is an ink jet printer.

5. The method of claim 1 wherein the printer is an electrophotographic printer.

6. The method of claim 1 further comprising adjusting by one or more of the following: hue, chroma, luminous, memory color, white paint, primary colors, clear coat compensation and surface condition compensation.

7. The method of claim 1 further comprising making a select adjustment interactively, such as with a sliding scale selector.

8. An electrographic printer for printing on receivers using a print engine to print a digital image on a substrate, said printing being performed in accordance with initial printing settings and selections from a plurality of transforms; to generate prints on the receiver with multiple look-and-feel finishes from a digital image which was captured by an image capture device comprising:
- a. input device for receiving an RGB input device profile from a digital image captured by a capture device using RGB-encoded picture elements;
- b. processor adapted for:
  - i. transforming RGB encoded picture elements using RGB input device profile into profile connection space (PCS) encoded picture elements confined by the input device;
  - ii. selecting a pair of transforms from the plurality of photographic process device RGB transforms and using such selected paired transforms to convert the transformed PCS encoded picture elements of input device confined PCS into another PCS encoded picture elements of photographic process confined PCS space;
  - iii. enhancing the PCS encoded picture elements of photographic process confined PCS space;
  - iv. adjusting the PCS encoded picture elements of primary colors in the photographic process confined PCS space; and
  - v. determining corrective action resulting in the PCS encoded picture elements transformed to digital image to produce a new digital image which is corrected for color and tonal reproduction when printed from the printer on that receiver with that finish; and
- c. print engine to print the corrected transformed digital image by the printer on a receiver.

9. The printer of claim 8 further comprising a selection device to select one of a plurality of finishes for a particular look and feel.

10. The printer of claim 8, the processor further adapted to perform a quality control function to determine corrective action when the calculated color metric difference falls outside an expected range.

11. A method for enhancing a digital image which was captured by an image capture device and which is to be printed on a printer which forms monochrome or color images, on a receiver, comprising the steps of:
- a) providing a plurality of color and tonal transforms, each such transform being unique to a receiver finish and which corrects color for a digital image captured by the capture device using RGB-encoded picture elements for one or more surface conditions to give a photographic look and feel when printed by the printer;
- b) selecting a pair of transforms, including one backward and one forward color transform from the plurality of transforms and using such selected transform to transform the digital image into a digital image represented in profile connection space (PCS);
- c) adjusting the transformed digital image in PCS space based on one or more abstract color profiles to produce a new digital image in PCS space which is corrected for color and tonal reproduction when printed from the printer on that receiver with that finish;
- d) using the printer to print the corrected transformed digital image by the printer on that receiver with that finish; and
- f) repeating steps b), c), and d) until a user acceptable print is produced.

12. The method of claim 1 further comprising overcoating with a clear dry ink.

13. The method of claim 1 wherein the image capture device is a digital camera.

14. The method of claim 1 wherein the printer is an ink jet printer.

15. The method of claim 1 wherein the printer is an electrophotographic printer.

16. An image control method for controlling a color reproduction device with high-accuracy using multiple color transforms pre-loaded into a color management system to generate prints on a receiver with multiple look-and-feel finishes from a digital image which was captured by an image capture device comprising the steps:
- a. providing a plurality of color and tonal transforms, each such transform being unique to a receiver finish and which corrects color for a digital image captured by the capture device using RGB-encoded picture elements for one or more surface conditions to give a photographic look and feel when printed by the printer;
- b. selecting from multiple look-and-feel finish selections including a color metric and selecting a pair of transforms from the plurality of transforms and using such selected transform pair to transform the digital image to achieve the look-and-feel finish;
- c. correcting the transformed digital image to produce a new digital image which is corrected for color and tonal reproduction when printed from the printer on that receiver with that finish by calculating a color difference between the current color metric and a nominal expected color metric for that print job on the receiver with the finish selected;
- d. determining when the calculated color difference falls inside an expected range; and
- e. correcting the transformed digital image to produce a new digital image which is corrected for color and tonal reproduction when printed from the printer on that receiver with that finish; d) using the printer to print the corrected transformed digital image by the printer on that receiver with that finish; and e) repeating steps b), c), and d) until a user acceptable print is produced.

17. The method of claim 16 further comprising two or more premium ICC color profiles designed for optimum photo performance of output with one profile tuned for closest reproduction of professional photographic paper tonescale, color balance, hue and saturation and a second profile tuned for tonescale simulation of photo output but with higher saturation in primaries for consumers and professionals who prefer images with greater 'pop' capable on the press.

18. The image control system of claim 16 the processor further comprising two or more premium ICC color profiles designed for optimum photo performance of output with one profile tuned for closest reproduction of professional photographic paper tonescale, color balance, hue and saturation and a second profile tuned for tonescale simulation of photo output but with higher saturation in primaries for consumers and professionals who prefer images with greater 'pop' capable on the press.

19. The image control system of claim 16, the processor automatically selecting the optimum transform(s) to achieve a photographic look and feel for that receiver.

20. The image control system of claim 16, the processor further combining the cumulative captured measurements from prior selections.

21. The image control system of claim 16 further comprising a transmitter for transmitting some or all of the related information to one or more of a remote proofing devices, including calibrated monitors (soft proof) and proof printers (hard proof), for quality assurance use by remote users.

22. The image control system of claim 16 further comprising a user interactive device.

23. The image control system of claim 22 further comprising the nominal expected look and feel from one or more of the following: a collection of prints with standard RGB colorants from the document, a look up table (LUT), preinstalled as a preset value in the color reproduction device or accumulated from collected data from the color reproduction device.

* * * * *